(12) United States Patent
Zeidman

(10) Patent No.: US 11,781,786 B2
(45) Date of Patent: Oct. 10, 2023

(54) SYSTEM FOR PRODUCING ELECTRICITY FROM SOLAR ENERGY

(71) Applicant: Moshe Zeidman, Rishon LeTsiyon (IL)

(72) Inventor: Moshe Zeidman, Rishon LeTsiyon (IL)

(*) Notice: Subject to any disclaimer, the term of this patent is extended or adjusted under 35 U.S.C. 154(b) by 54 days.

(21) Appl. No.: 17/222,258

(22) Filed: Apr. 5, 2021

(65) Prior Publication Data

US 2022/0316761 A1 Oct. 6, 2022

(51) Int. Cl.
*F24S 10/95* (2018.01)
*F03D 9/00* (2016.01)

(52) U.S. Cl.
CPC .............. *F24S 10/95* (2018.05); *F03D 9/007* (2013.01)

(58) Field of Classification Search
CPC ................................. F03D 9/007; F24S 10/95
USPC .................................... 126/634; 60/641.1–15
See application file for complete search history.

(56) References Cited

U.S. PATENT DOCUMENTS

2008/0041054 A1* 2/2008 Montesinos .............. F28D 1/04
60/641.8

OTHER PUBLICATIONS

Freeman, James. Hellgardt, Klaus. And Markides, Christos. An assessment of solar-powered organic Rankine cycle systems for combined heating and power in UK domestic applications. Applied Energy. 2015 (Year: 2015).*

* cited by examiner

*Primary Examiner* — Vivek K Shirsat
(74) *Attorney, Agent, or Firm* — Patshegen IP; Moshe Pinchas

(57) ABSTRACT

A system for producing electricity from solar energy is provided. The system includes a solar panel for disposing such that solar radiation impinges thereon. The solar panel includes fluid pipes configured for heating fluid therein by the solar radiation. The system further includes a fluid container in fluid communication with the fluid pipes, having an inlet configured to receive heated fluid from the solar panel and an outlet configured to transfer fluid back to the solar panel; a gas line disposed in the fluid container, the gas line having a liquid gas being configured to evaporate by the heat generated by the fluid and to increase thereby pressure in the gas line; and a turbine having a rotor configured to convert rotating motion to electricity, the turbine being configured to receive evaporated gas from the gas line and the evaporated gas is configured to rotate the motor.

11 Claims, 3 Drawing Sheets

SYSTEM FOR PRODUCING ELECTRICITY FROM SOLAR ENERGY

FIELD OF INVENTION

The presently disclosed subject matter relates to a system for producing electricity from solar energy.

BACKGROUND

The market for alternative power production using renewable sources is growing owing to advances in materials, the tremendous reduction in costs of such systems, and the growing desire to use means other than fossil fuels. The most plentiful of these resources is the Sun and there are several ways to generate electricity making use of it. Currently, the lowest cost of these is to devise a system using PhotoVoltaic (PV) panels.

The drive to use renewable energy sources has led to a number of innovations in using environmental energy sources. How one then uses the energy from the environment for useful generation of electricity is still a subject of research. System efficiencies of low cost systems are still below 18%.

SUMMARY OF INVENTION

There is provided in accordance with an aspect of the presently disclosed subject matter a system for producing electricity from solar energy. The system includes a solar panel for disposing such that solar radiation impinges thereon. The solar panel includes fluid pipes configured for heating fluid therein by the solar radiation. The system further includes a fluid container in fluid communication with the fluid pipes, having an inlet configured to receive heated fluid from the solar panel and an outlet configured to transfer fluid back to the solar panel; a gas line disposed in the fluid container, the gas line having a liquid gas being configured to evaporate by the heat generated by the fluid and to increase thereby pressure in the gas line; and a turbine having a rotor configured to convert rotating motion to electricity, the turbine being configured to receive evaporated gas from the gas line and the evaporated gas is configured to rotate the motor.

The can be configured to shift between a liquid state and a gaseous state, and wherein the gas is shifted from liquid state to gaseous state as a result of the heat from the fluid inside the fluid container. The gas can be freon.

The gas can be configured to generate pressure of at least 100 PSI when shifting from its from liquid state to gaseous state.

The gas when shifting from its from liquid state to gaseous state can be configured to generate pressure at a rate which corresponds to the amount of energy consumed by the turbine. The pressure of the gas when entering the turbine can be at least 300 PSI and pressure of the gas when exiting the turbine is lower than 200 PSI.

The gas line can be in a form of a spring increasing thereby the path of the gas pipe inside the fluid container.

The system can further include a liquid pump for forcing gas towards the fluid container.

The system can further include a cooling device configured to cool off the gas from the turbine so as to shift the gas to the liquid state thereof.

The system can further include a heat recovery tank configured to receive heated gas from the turbine and begin configured for heat exchange between the heated gas and recovery fluid, and wherein the system further includes a preheater chamber configured to receive fluid from the fluid container and begin configured for heat exchange between the recovery fluid and the fluid container.

The heat recovery tank and the preheater chamber are coupled by a recovery pipeline which extends inside the heat recovery tank, and is configured to absorb remaining heat of the gas into the recovery fluid and to transfer the recovery fluid to the preheater chamber.

The system can further include a reservoir container, the reservoir container being configured for receiving the fluid from the fluid container after the liquid gas has evaporated, and for transferring the fluid back to the fluid container.

There is provided in accordance with an aspect of the presently disclosed subject matter a system for producing electricity from water heating system having a solar panel including fluid pipes for heating fluid therein by solar radiation and a reservoir container in fluid communication with the fluid pipes, having an inlet configured to receive heated fluid from the solar panel and an outlet configured to transfer fluid back to the solar panel, the system comprising:

a gas line configured to be disposed in the fluid container, the gas line having a liquid gas being configured to evaporate by the heat generated by the fluid and to increase thereby pressure in the gas line;

a turbine having a rotor configured to convert rotating motion to electricity, the turbine being configured to receive evaporated gas from the gas line and the evaporated gas is configured to rotate the motor.

BRIEF DESCRIPTION OF THE DRAWINGS

In order to understand the disclosure and to see how it may be carried out in practice, embodiments will now be described, by way of non-limiting examples only, with reference to the accompanying drawings, in which.

DETAILED DESCRIPTION OF EMBODIMENTS

Figure 1:
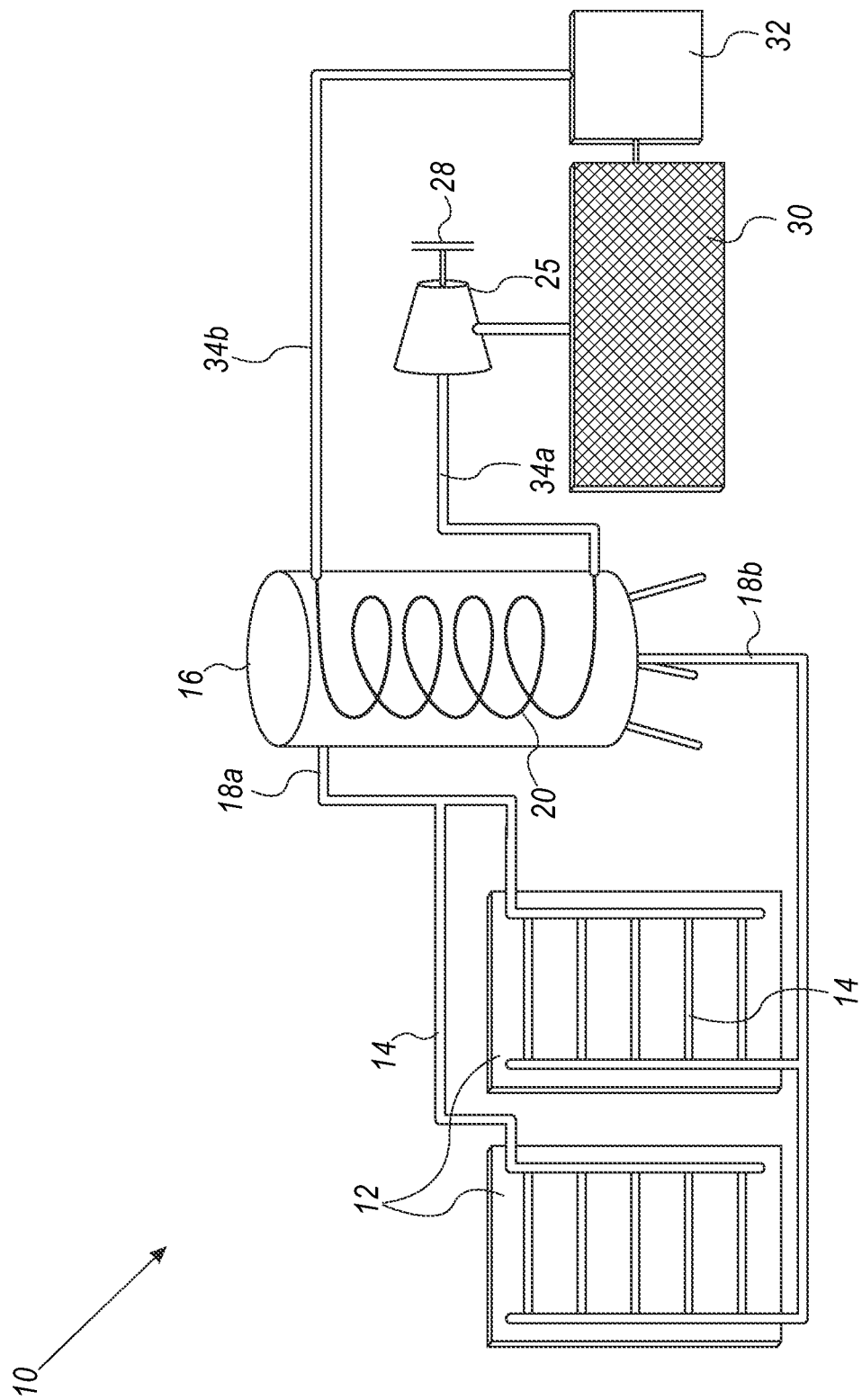
FIG. 1 is block diagram illustration of the system for producing electricity from solar energy in accordance with an example of the presently disclosed subject matter.
Figure 2:
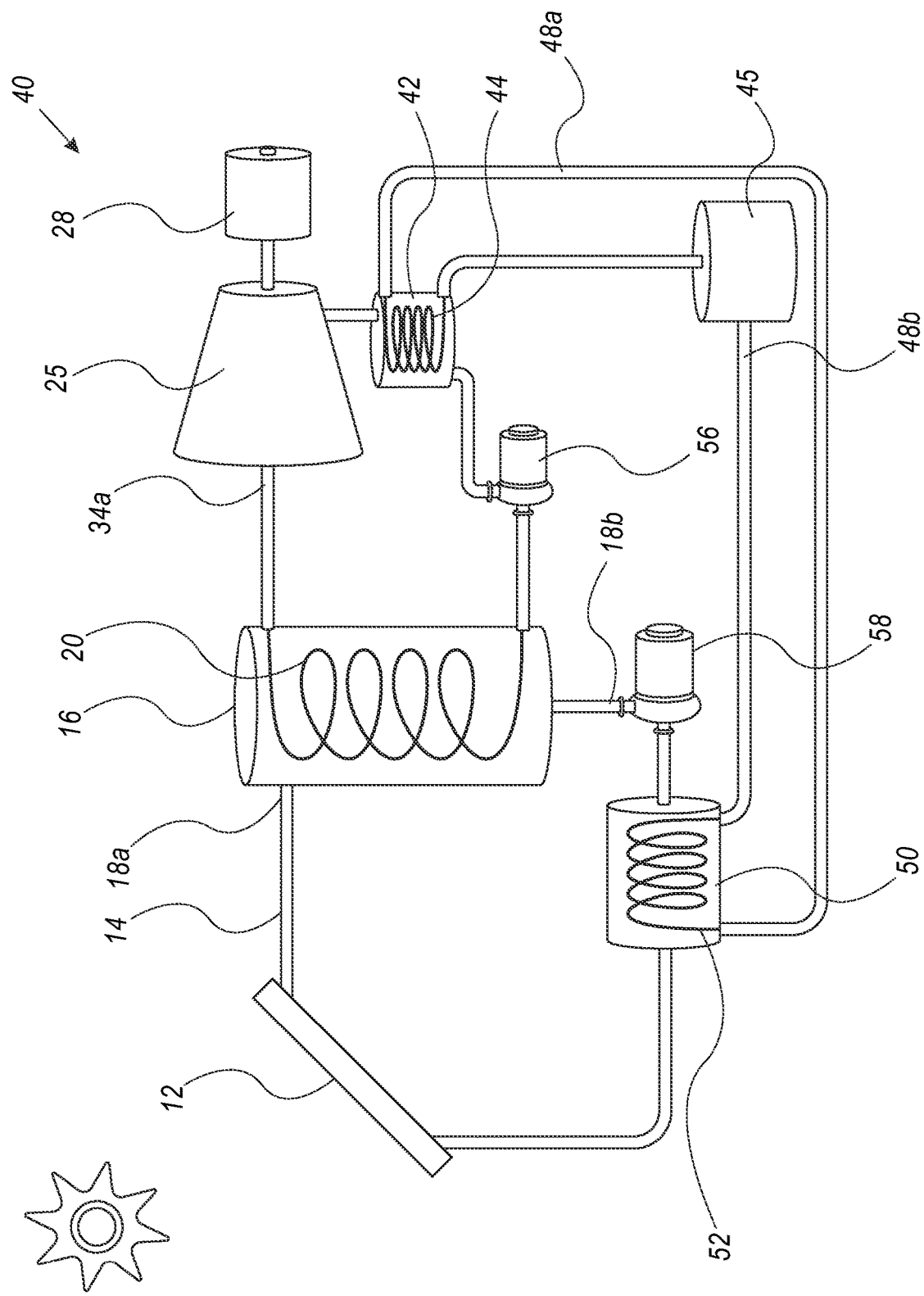
FIG. 2 is a is block diagram illustration of the system for producing electricity from solar energy in accordance with another example of the presently disclosed subject matter.

FIGS. 1 and 2 show a system 10 for producing electricity from solar energy, the system includes a solar panel 12 for installing on a building roof (not shown) or other locations, such that solar radiation impinges thereon. The solar panel 12 includes fluid pipes 14 configured for heating fluid therein by the solar radiation.

According to the illustrated example the fluid pipes 14 extend along an undulated path inside the solar panel 12, so as to increase the length of the path of the pipes along the solar panel 12 increasing thereby the exposure of the fluid inside the pipes 14 to the heat of absorbed by the solar panel 12.

The system further includes a fluid container 16 in fluid communication with the fluid pipes 14, and having an inlet 18a configured to receive heated fluid from the solar panel 12 and an outlet 18b configured to transfer fluid back to the solar panel.

The fluid container 16 includes a gas line 20 disposed in the fluid container 16, and having a liquid gas flowing therein. Thus, the liquid gas is heated by the fluid inside the container 16. The pipes 14, the container 16 and the fluid therein thus serves as a heat transferring mechanism for transferring heat from the solar panel 12 to the gas line 20. The gas line 20 inside the container 16 acts as a heat exchanger, heating the liquid gas and cooling off the fluid in the container 16. The pipes 14 extends from the container back towards the solar panel 12 in a close loop to heat the fluid again.

The gas line 20 according to the illustrated example is in a form of a spring, increasing thereby the length of path inside the container 16 and providing a better heat exchange between the fluid in the container 16 and the gas in the gas line 20.

The gas line 20 includes a liquid gas which is heated by the heat generated by the solar panel 12. The gas is selected such that its thermodynamic properties allow the gas to evaporate by the heat generated by the fluid from the solar panel 12, and to increase thereby pressure in the gas line. I.e., the gas is selected such it shifts in the system between liquid state and gaseous state, thereby providing pressure gradient. In other words, the gas is selected such that the evaporating points thereof is at a temperature which can be achieved by the heat from the solar panel 12.

This way, when the temperature of the gas is below evaporating points the gas is in its liquid state. The gas line 20 extends out of the container 16 away from the heated fluid via a gas outlet 34a such that gas in portions of the gas line 20 which are not in contact with the fluid inside the container 16 cools off. As a result, the gas can be heated by the fluid inside the container 16 to its evaporating point increasing thereby the pressure in the gas line and when the gas is transferred away from the container 16 the gas is cooled off back to its liquid state.

Moreover, it is desired to use gas which has a relatively high PSI difference between its liquid state and gaseous state, such that shifting the gas to its gaseous states provides high pressure. More particular, in order to provide sufficient energy which can be converted to electrical energy is it desired that the pressure obtained in the gaseous state provides an additional 100 PSI, which can be utilized to operate a generator. For example, it is desired that when the gas is converted to its gaseous state the pressure is at least 300 PSI and when in the liquid state the pressure is 200 PSI. This way, the generator can consume 100 PSI for generating electric energy.

An example of such gas is Freon Refrigerant—R422 which has an evaporating temperature of 70° Celsius, and its condensing temperature is 38° Celsius at 200 PSI. Freon Refrigerant—R422 further has an expansion coefficient gas which provides high pressure of 300 PSI and more when the gas is converted to its gaseous state.

Thus, the Freon Refrigerant—R422, reaches 300 PSI when evaporating, and after exiting the generator when the gas is at 200 PSI, the gas needs to be cooled off only to 38° Celsius in order to be converted back to liquid. This way, simple means can be used to cool off the gas, such as a radiator, and not much energy is required for cooling the gas.

Alternatively, Freon Refrigerant R410 can be used, which is substantially the same as Freon Refrigerant—R422, however has a higher expansion coefficient, thus allowing utilizing less amount of gas to reach the same rate of PSI.

In other words, the gas is selected such that its thermodynamic properties allow the gas to evaporate by the heated fluid in the container 16 and to increase thereby pressure in the gas line 20. I.e., the gas is selected such it shifts in the system between liquid state and gaseous state, thereby providing pressure gradient. This way, when the temperature of the gas is below evaporating points the gas is in its liquid state.

The system 10 further includes a turbine 25 having a rotor 28 configured to convert rotating motion to electricity. The turbine 25 is coupled to gas outlet 34a and is configured to receive evaporated gas from the gas line 20 such that the evaporated gas rotates the rotor 28.

The gas line 20 further extends from the turbine 25 back to the container 16 forming a close loop via gas inlet 34b. Thus, while the energy from the pressurized gas is utilized for motorizing the rotor, pressure in the gas line exiting the turbine 25 is reduced and consequently, the temperature of the gas is lowered. The gas is then heated again by the liquid in the container 16 further pressurizing the gas and allowing another cycle of the gas towards the turbine 25.

The gas line 20 extends out of the container 16 via gas outlet 34a such that gas, in portions of the gas line 20 which are not in contact with the fluid inside the container 16, cools off. As a result, when introducing the gas back to the container 16 via gas inlet 34b, the gas can be heated again by the fluid inside the container 16 to its evaporating point increasing thereby the pressure in the gas line 20 and when the gas is transferred away from the container 16 the gas is cooled off back to its liquid state. It is however required that the gas is further cooled off to a temperature lower than the evaporating point of the gas, so the gas is shifted back to its liquid state. For that the system can include a cooling device 30 such as a radiator or other cooling system such as carnot cycle etc. The cooling device 30 is configured to receive the gas from the turbine 25, to further cool the gas to the desired temperature and to transfer the cooled gas back to the gas line 20 inside the container 16. Furthermore, a gas liquid pump 32 may be used so as to force the liquid gas towards the container 16 via gas inlet 34b.

Reference is now made to FIG. 2, showing a further example, in which same elements are designated same numeral references as in the example of FIG. 1. System 40 includes a solar panel 12 having fluid pipes 14 extending towards a fluid container 16 to transfer fluid heated by the solar panel 12 into the container 16 via an inlet 18a.

The fluid container 16 includes a gas line 20 having a liquid gas flowing therein, such that heated gas is transferred via gas outlet 34a to a turbine 25 having a rotor 28.

According to the illustrated example, the system 40 further includes an energy recovery system which increases the efficiency of the system 40 by using the remaining heat in the gas to preheat the fluid entering the solar panel 12. The energy recovery system includes a heat recovery tank 42 which is configured to receive gas from container 16, after passing through the turbine 25, and transfer the gas back to the container 16. The heat recovery tank 42 includes recovery pipeline 44 including recovery fluid. The recovery pipeline 44 which extends inside the heat recovery tank 42 absorbs the remaining heat of the gas by heating the recovery fluid. This way, the gas entering the container 16 via gas inlet 34b is cooled off to even lower temperature, increasing thereby the difference between the temperature of the gas entering the container 16 and the heated gas exiting the container 16, thus increasing the pressure gradient generated by the heating of the gas inside the container 16.

The energy recovery system further includes a preheater chamber 50 being configured to receive fluid from the outlet 18b of the container 16 before the fluid is transferred into the solar panel 12. The preheater chamber 50 includes a heat exchange pipe 52 which is in fluid communication with the heat recovery tank 42, such that heated recovery fluid is transferred from the heat recovery tank 42 to the heat exchange pipe 52 via inlet pipes 48*a*.

Thus, fluid exiting the container 16, after transferring its heat to the gas in the gas line 20, is transferred to the preheater chamber 50 to be heated by the recovery fluid inside the heat exchange pipe 52. Since the fluid exiting the container 16 is cooled off and has relatively low pressure, a fluid pump 58 may be used for forcing the fluid into the preheater chamber 50. The heat exchange pipe 52 facilities the heating of the fluid before entering the solar panel 12, increasing thereby the efficiency of the solar heating process. The recovery fluid is then transferred back to the heat recovery tank 42 via outlet pipes 48*b* which may include heat recovery pump 45.

After the gas is further cooled off by the heat recovery tank 42, the cooled off gas is urged back to the container 16 via gas inlet 34*b*, which may include gas pump 56 forcing the gas into the container 16.

Accordingly, the energy recovery system increases the efficiency of the system 40, by further reducing the heat of the gas before entering the container 16, and by using the remaining heat from the gas to preheat the fluid prior to entering the solar panel 12.

Figure 3:
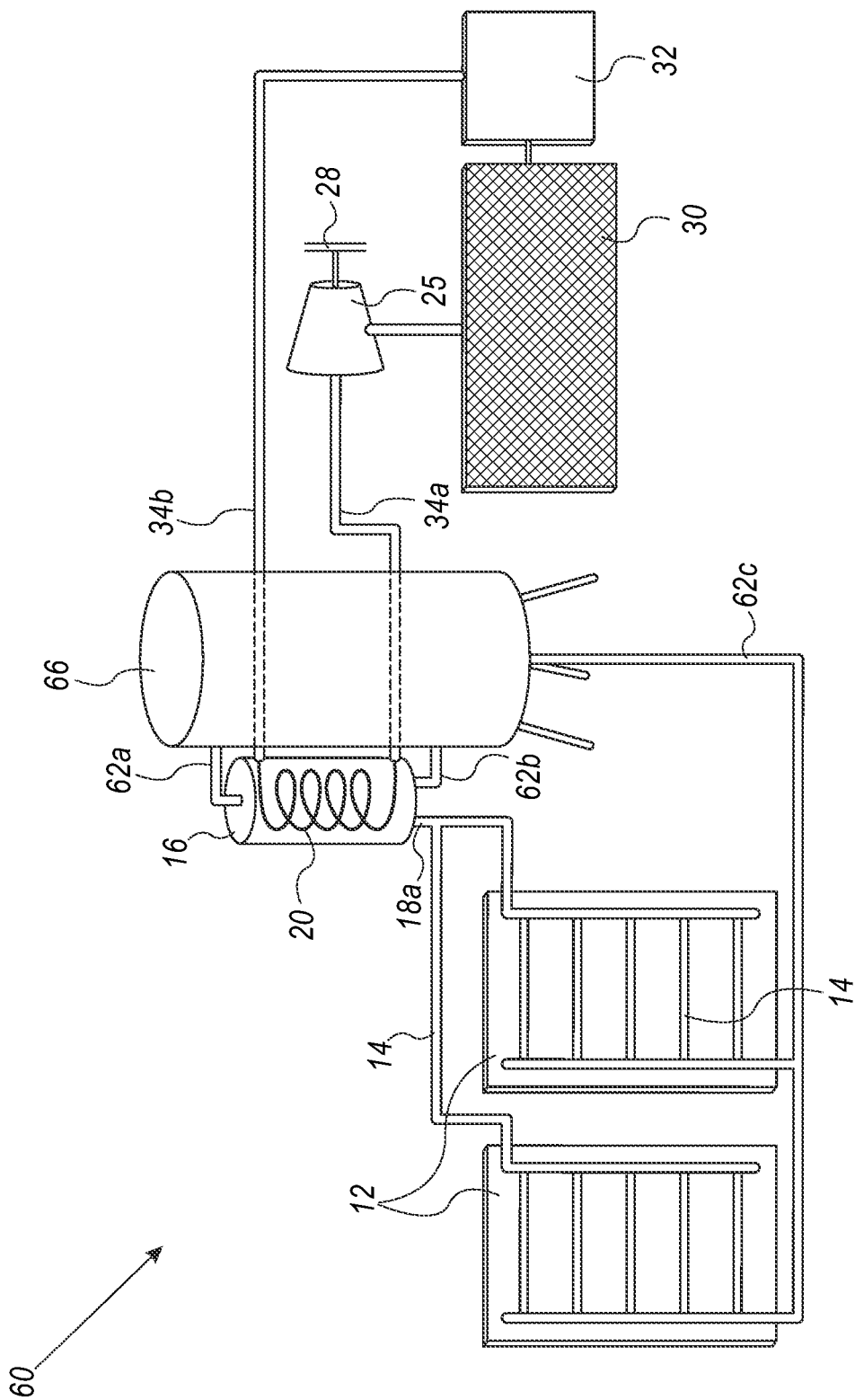
FIG. 3 is a is block diagram illustration of the system for producing electricity from solar energy in accordance with yet another example of the presently disclosed subject matter.

Reference is now made to FIG. 3, showing a further example, in which same elements are designated same numeral references as in the example of FIG. 1. System 60 includes a solar panel 12 having fluid pipes 14 extending towards a fluid container 16 to transfer fluid heated by the solar panel 12 into the container 16 via an inlet 18*a*. The fluid container 16 includes a gas line 20 having a liquid gas flowing therein, such that heated gas is transferred via gas outlet 34*a* to a turbine 25 having a rotor 28. As in the example of FIG. 1, the system 60 can include a cooling device 30 which receives the gas from the turbine 25 and transfers the cooled gas back to the container 16.

The system 60 further include a reservoir container 66, which is configured to hold hot fluid from the solar panel 12. According to an example, heated fluid from the solar panel 12 is transferred via the fluid container 16 to heat the gas inside the gas line 20. The fluid is then transferred to the reservoir container 66 via inlet 62*a*, and is held inside the reservoir container 66.

After the gas inside the gas line 20 is transferred via the turbine and the cooling device 30 back into the fluid container 16, hot fluid from the reservoir container 66 can be used for heating the gas once again. This can be carried out by transferring hot fluid from the reservoir container 66 via feed line 62*b*. This way, in case, fluid cannot be heated by the solar panel 12, such as during times of low solar radiation, the system 60 can still operate by using the hot fluid inside the fluid container 16. The reservoir container 66 can include an outlet 62*c*, for transferring cold fluid back to the solar panel 12. This way, when fluid inside the reservoir container 66 has reached a temperature below a certain threshold, the fluid is transferred back to the solar panel 12 to be heated again. The threshold can be determined as a temperature in which the fluid can no longer effectively heat the gas in the gas line 20 to create the desired pressure gradient.

The above-described system is designed to efficiently capture a significant fraction of incident solar energy and cause water to be heated to more than that required for domestic use and more than 25% of all industrial applications. Certain of these systems, those based on sealed tube technology, can provide temperatures as high as 130 C (266 F) and are routinely available worldwide. The heated water which is stored in the reservoir container 66 serves as a thermal storage asset and hence is available for other purposes.

According to an example the solar panel includes standard evacuated tube solar collectors. Because the evacuated tubes are used, the temperature can reach well over 100 C (212 F) and thus represents a considerable power reservoir. This thermal energy is absorbed by a refrigerant which evaporates and becomes a potent gas jet which drives an air turbine and which, in turn, powers an electrical generator. Such a configuration was recently tested and shown to convert 20% of this thermal energy to electrical power.

This configuration, while one of the most efficient of its kind, can be shown to perform at even higher levels when a significant fraction of the rejected heat (the other 80%) is captured and returned to the reservoir container 66. Such can be done using a second heat pump with a high CoP such as is available today. When this is done, the efficiency rivals that of many fossil fuel power stations in operation today but operates at considerably lower temperature and hence can be made at significantly lower cost.

According to an example, the system 60 of FIG. 3, can be integrated in an existing solar-powered water heater having solar panel and a water tank. The fluid container 16 can be coupled to the existing solar panel instead of, or in addition to, the existing water tank. The heated fluid from the solar panel is used for heating the gas in the gas line inside the fluid container 16. The heated fluid can then be transferred to the water tank, which now serves as a energy reservoir, similar to the reservoir container 66 of FIG. 3. In addition, the outlet of the water tank is disconnected from the hot water main and is connected to the feed hot fluid back into the fluid container 16, as described in connection with the reservoir container 66 of FIG. 3.

When testing such systems, temperatures in the storage tank reached around 100 C and temperatures reaching the subsequent turbine were on the order of 85 C. The turbine used was a modified air turbine typical of those used in pneumatic tooling. It was powered by the expansion of a high critical temperature refrigerant (R411) in gas form which has very favorable Organic Rankine Cycle (ORC) properties. The measured power output was 20% of the energy provided by the Sun. The remaining 80% of the energy was removed by a chiller which also condensed the refrigerant back to a liquid. From here a pump drove the liquid refrigerant back through the thermal storage tank where it again vaporized and became a high-pressure gas to drive the turbine.

Those skilled in the art to which the presently disclosed subject matter pertains will readily appreciate that numerous changes, variations, and modifications can be made without departing from the scope of the invention, mutatis mutandis.

The invention claimed is:

1. A system for producing electricity from solar energy, the system comprising:
    a solar panel configured for disposing such that solar radiation impinges thereon, said solar panels includes fluid pipes configured for heating fluid therein by the solar radiation;
    a fluid container in fluid communication with said fluid pipes, having an inlet configured to receive heated fluid from said solar panel and an outlet configured to transfer fluid back to said solar panel;

a gas line disposed in said fluid container, said gas line having a liquefied gas being configured to evaporate by the heat generated by said fluid and to increase thereby pressure in said gas line;

a turbine having a rotor configured to convert rotating motion to electricity, said turbine being configured to receive evaporated gas from said gas line and said evaporated gas is configured to rotate said rotor; and, a reservoir container, said reservoir container having a reservoir inlet for receiving said fluid from said fluid container after said liquefied gas has evaporated, and said reservoir container further includes a reservoir outlet for transferring said fluid back to the fluid container.

2. The system of claim 1 wherein said gas is configured to shift between a liquid state and a gaseous state, and wherein said gas is shifted from liquid state to gaseous state as a result of the heat from said fluid inside said fluid container.

3. The system of claim 2 wherein said gas is freon.

4. The system of claim 2 wherein said gas generates pressure of at least 100 PSI when shifting from its from liquid state to gaseous state.

5. The system of claim 2 wherein said gas when shifting from its from liquid state to gaseous state generates pressure at a rate which corresponds to the amount of energy consumed by said turbine.

6. The system of claim 5 wherein pressure of the gas when entering the turbine is at least 300 PSI and pressure of the gas when exiting the turbine is lower than 200 PSI.

7. The system of claim 1 wherein said gas line is in a form of a spring increasing thereby the path of said gas pipe inside said fluid container.

8. The system of claim 1 further comprising a gas pump for forcing gas towards the fluid container.

9. The system of claim 1 further comprising a cooling device configured to cool off the gas from the turbine so as to shift the gas to the liquid state thereof.

10. The system of claim 1 wherein said reservoir container further includes an auxiliary outlet, said auxiliary outlet being configured such that when fluid inside the reservoir container has reached a temperature below a predetermined threshold, the fluid is transferred back to the solar panel.

11. A system for producing electricity from water heating system having a solar panel including fluid pipes for heating fluid therein by solar radiation and a reservoir container in fluid communication with said fluid pipes, having a reservoir inlet and a reservoir outlet, the system comprising:

a fluid container in fluid communication with said fluid pipes, having an inlet configured to receive heated fluid from said solar panel and an outlet configured to transfer fluid back to said solar panel;

a gas line configured to be disposed in the fluid container, said gas line having a liquefied gas being configured to evaporate by the heat generated by said fluid and to increase thereby pressure in said gas line;

a turbine having a rotor configured to convert rotating motion to electricity, said turbine being configured to receive evaporated gas from said gas line and said evaporated gas is configured to rotate said motor;

wherein the reservoir inlet is configured for transferring said fluid from said fluid container into said reservoir container after said liquefied gas has evaporated, and said reservoir outlet is configured for transferring said fluid back to the fluid container.

* * * * *